United States Patent [19]

Werner

[11] Patent Number: 4,743,990
[45] Date of Patent: May 10, 1988

[54] TEST CASSETTE FOR MEASURING CAPSTAN AZIMUTH ANGLES

[75] Inventor: Sabine Werner, Hüttenberg, Fed. Rep. of Germany

[73] Assignee: U.S. Philips Corp., New York, N.Y.

[21] Appl. No.: 944,300

[22] Filed: Dec. 18, 1986

Related U.S. Application Data

[63] Continuation-in-part of Ser. No. 916,921, Oct. 9, 1986.

[30] Foreign Application Priority Data

Oct. 16, 1985 [DE] Fed. Rep. of Germany ....... 3536777

[51] Int. Cl.$^4$ .......................... G11B 5/02; G11B 23/04
[52] U.S. Cl. ...................................... 360/137; 360/132
[58] Field of Search ................................ 360/137, 132

[56] References Cited

U.S. PATENT DOCUMENTS 4,584,620 4/1986 Dopp et al. .......................... 360/137

*Primary Examiner*—Robert S. Tupper
*Attorney, Agent, or Firm*—David R. Treacy

[57] ABSTRACT

Azimuth angle of the capstan of a magnetic-tape-cassette apparatus is measured using a cassette having a reference sensor which engages the cassette, and at least one measurement sensor which engages the cassette at a location spaced axially from the reference sensor. The measurement sensor includes an electrical measuring element such as a strain gauge which provides an indication of the position of the element with respect to the reference sensor. The azimuth angle can readily be computed using the known axial spacing between the sensors and the electrical value transmitted from the measurement sensor.

5 Claims, 3 Drawing Sheets

TEST CASSETTE FOR MEASURING CAPSTAN AZIMUTH ANGLES

This application is a continuation-in-part application of Ser. No. 916,921, filed Oct. 9, 1986 and now abandoned.

BACKGROUND OF THE INVENTION

The invention relates to a test cassette with electrical transmission of measured valves, for measuring the position of an element in a magnetic-tape-cassette apparatus. In such a cassette the element is sensed by means of at least one measurement sensor, which supplies a measurement value via an electrical measuring element. This value provides an indication of the position of the element in the apparatus.

A test cassette by means of which functional data of magnetic-tape-cassette apparatuses can be measured and can be transmitted to display equipment via electrical leads is known. The test cassette comprises at least one sensor which senses a magnetic head, a strain-gauge being employed to generate a measurement value which provides an indication of the position of the magnetic head in the apparatus.

For this purpose the sensor is arranged on a blade spring carrying one or a plurality of strain gauges.

SUMMARY OF THE INVENTION

It is the object of the invention to provide a test cassette of the type defined in the opening paragraph, which enables the azimuth position of a capstan inside the apparatus to be determined and corresponding electrical measurement values to be transmitted to a measuring apparatus.

According to the invention this object is achieved in that a reference sensor together with the measurement sensor is arranged in the cassette housing in such a way that, when the cassette is present in the apparatus, these sensors together sense the azimuth position of a capstan of the apparatus, the azimuth position being derived electrically from the measurement value.

The test cassette readily enables the capstan angle relative to the apparatus chassis to be determined. Once this angle has been determined, the azimuth position of the capstan can be corrected.

In a further embodiment of the invention the contact faces of the two sensors engage with the capstan in such a way that they are axially offset from one another by a fixed predetermined reference distance. As the two sensors are engageable with the capstan at a fixed predetermined axial distance from each other, the capstan angle and hence the azimuth position can be derived from this distance and the measurement value measured by means of the measurement sensor, thus enabling the azimuth position to be corrected when necessary.

In a preferred embodiment of the invention the reference sensor forms part of a support which also carries the measurement sensor. Thus, the sensors can cooperate with each other in a very simple manner. The reference sensor supplies a zero-reference value and the measurement sensor supplies the measurement value. The fixed predetermined reference distance and the measurement value supplied by the measurement sensor guarantee that possible misalignments of the capstan can be determined correctly. In this respect it is important that the reference sensor is mounted in the cassette housing with minimal play.

In yet another embodiment of the invention, two measurement sensors are rotatably mounted on the support, the directions in which the two measurement sensors are applied being 90° offset relative to each other about the capstan axis, and the measurement sensors being engageable with the capstan under pre-tension. In this way measurement values for three dimensions are obtained, thereby providing optimum measurement values for the capstan alignment.

In a particular preferred embodiment of the invention the measurement sensors are connected to blade springs on which strain gauges are arranged. During sensing the blade springs urge the capstan against stops on the support. In this way the sensors act on the capstan with a gentle pressure, so as to preclude damage to the capstan. In addition, this facilitates application of the cassette.

An embodiment of the invention will be described in more detail, by way of example, with reference to the accompanying drawing.

DESCRIPTION OF THE PREFERRED EMBODIMENT

Figure 1:
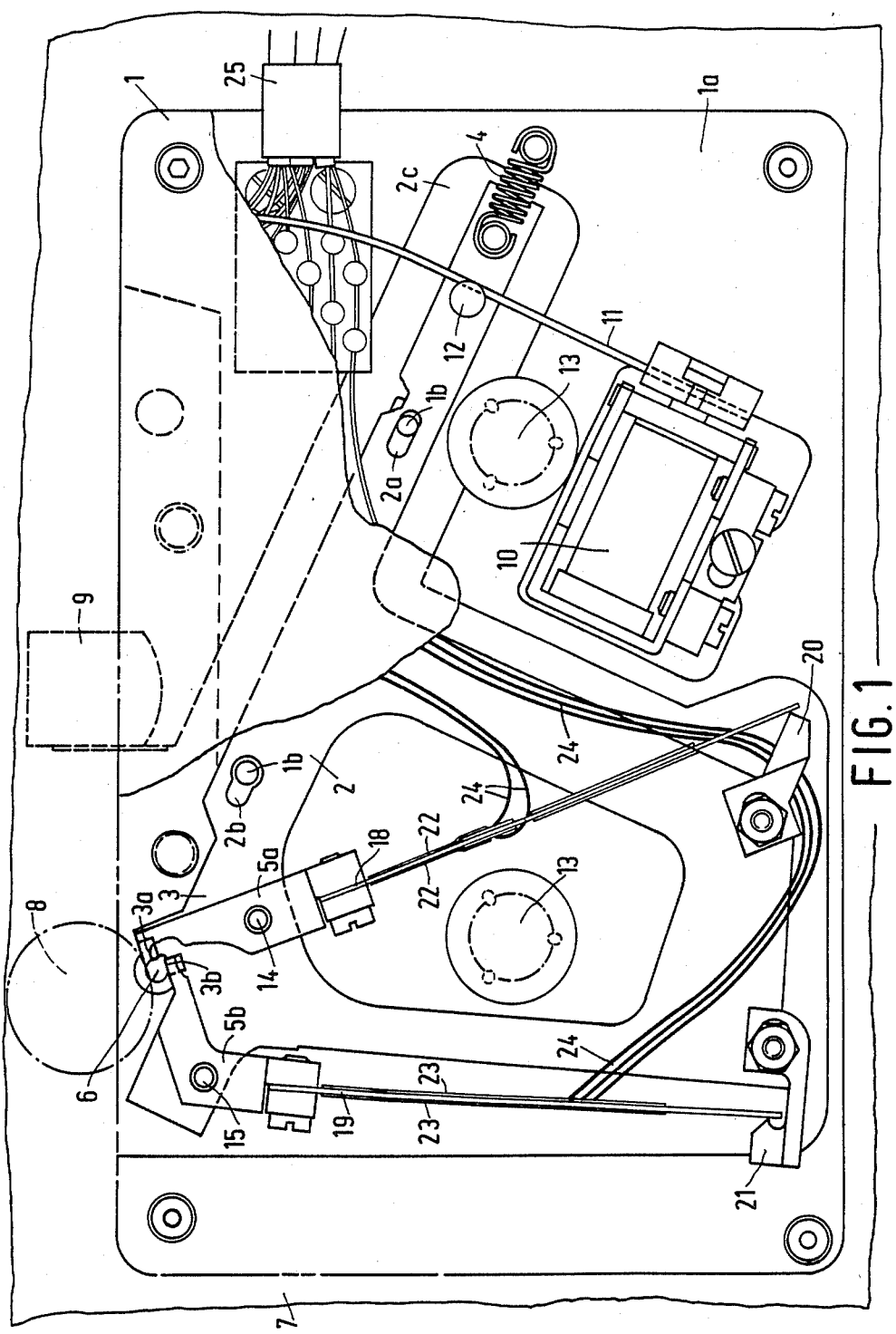
FIG. 1 is a plan view of a partly open test cassette placed in a magnetic-tape apparatus, the cassette sensing the capstan position by means of sensors.
Figure 2:
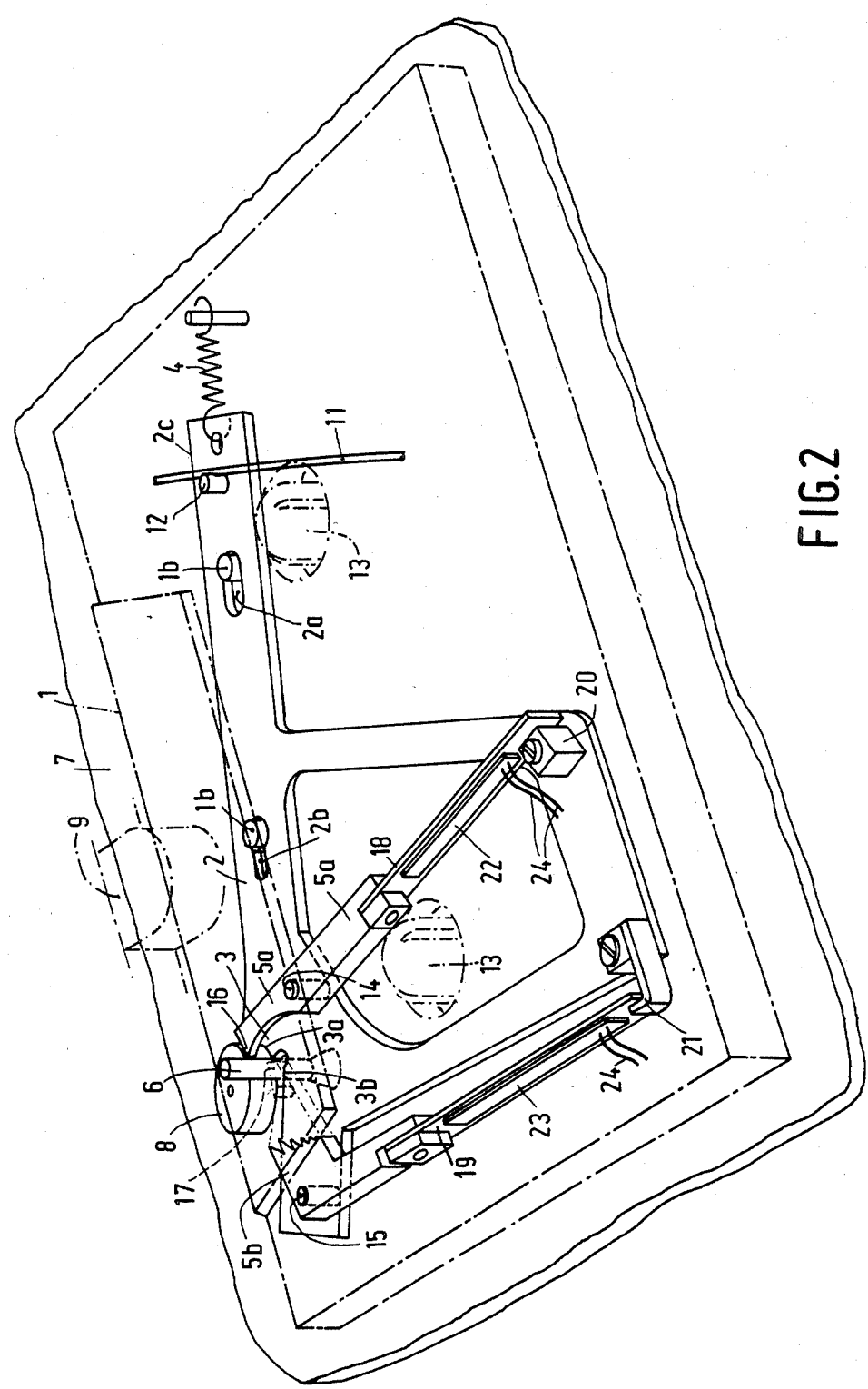
FIG. 2 illustrates essential parts of the test cassette shown in FIG. 1.

Inside the test cassette 1 shown in FIGS. 1 and 2 three sensors are arranged: a reference sensor 3 and two measurement sensors 5a, 5b. The reference sensor 3 is situated on a support 2 and is movable relative to a bottom plate 1a of the test cassette 1. For this purpose the support is formed with two slots 2a, 2b which are engaged by guide pins 1b. A spring 4 acts on the rearward end 2c of the support 2 and tends to pull the reference sensor 3 away from a capstan 6. This capstan forms part of a reproducing apparatus, of which a part 7 of a deck plate is shown. A pressure roller 8 is journalled on the deck plate and can be pressed against the capstan 6 during operation of the apparatus. The apparatus comprises a sound head 9, which is only shown by way of illustration.

An electromagnet device 10 is arranged on the bottom plate 1a of the test cassette 1. This electromagnet device 10 can attract a resilient lever arm 11, which acts on a pin 12 of the support 2 and is arranged to be capable of moving the support towards the capstan 6 against the tension of the spring 4. The arrangement of the support 2 is such that as it moves it cannot contact the winding spindles 13 of the apparatus.

The reference sensor 3 comprises two angularly spaced contact faces 3a, 3b, which are engageable against the capstan 6. Suitably, the contact faces 3a and 3b extend at right angles to each other. The support 2 is mounted on the pins 1b with such a clearance that it is easily movable and rotatable, ensuring that the two contact faces 3a and 3b always come into contact with the capstan 6 when the support is moved forwards. When the contact faces 3a and 3b lie against the capstan the reference sensor 3 has reached the zero reference.

The support 2 is provided with two journals 14 and 15 on which the two measurement sensors 5a and 5b are rotatable. The measurement sensors 5a and 5b are provided with sensor tips 16 and 17. The journals 14 and 15 of the measurement sensors 5a and 5b extend substantially parallel to the axis of the capstan 6. The sensor tips 16 and 17 are arranged on the measurements sensors 5a and 5b in such way that they can be applied to the capstan 6 with an offset of 90° relative to each other about the capstan axis. The direction of movement of the support 2 should extend at 45° relative to the directions in which the sensing tips 16 and 17 are applied.

The two measurement sensors 5a and 5b carry blade springs 18 and 19, which essentially extend away from the capstan 6. The free ends of the blade springs 18 and 19 abut with stops 20 and 21 on the support 2 when the support 2 is moved forward. Together with the spring 4 they provide the pretension of the sensor tips 16, 17. Suitably, the stops 20 and 21 are adjustable relative to the support 2. On the blade springs 18 and 19 strain gauges 21, 23 are arranged, which are connected to a connector 25 via electrical leads 24. This connector can be connected to a measuring apparatus, not shown.

Figure 3:
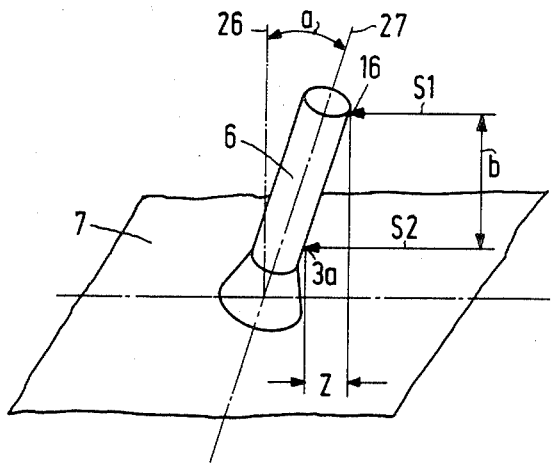
FIG. 3 shows a capstan which is inclined to an exaggerated extent, the inclined position of this capstan being determined by means of the test cassette.

FIG. 3 shows the capstan 6 arranged on the deck plate 7 in an excessively inclined position which bears the reference $\alpha$. The correct azimuth position of the capstan 6 is represented by the dot-dashed line 26. The misaligned position of the capstan 6 is indicated by the dash-dot line 27. The alignment angle $\alpha$ is situated between the lines 26 and 27. The measuring point of the sensor tip 16 of the measurement sensor 5a is indicated by the arrowhead of the line S1. A measuring point of the reference sensor 3, which is obtained when the contact face 3a engages against the capstan 6, is indicated by means of the arrowhead of the line S2.

The arrow heads S1 and S2 have a reference distance b from one another. The distance b is dictated by the arrangement of the sensors. The arrowhead S1 and S2 extend across each other in a first or x-plane. The contact face 3b of the reference sensor 3 and the sensor tips 17 of the measurement sensor 5b extend over each other, 90° offset relative to the arrowheads S1 and S2. These two measuring points are situated in y-plane of the coordinate system. This enables the angular position of the capstan 6 to be measured three-dimensionally.

For calculating the angular error the difference in length between the arrows S1 and S2 in the z-direction is indicated in FIG. 3. The difference in length bears the reference z. It follows that $$\tan \alpha = \frac{z}{b}$$

and $$\alpha = \arctan\left(\frac{z}{b}\right).$$

The output quantities of the strain gauges 22, 23 are resistance variations which are converted into a voltage difference by mean of a measurement bridge. A measurement amplifier enables the difference in length z to be indicated of the output voltage $U_D$ to be read. The azimuth error of the capstan 6 can be calculated as follows from the output voltage $U_D$:

$$\alpha = \arctan \frac{U_D \cdot l^2}{U_B \cdot k \cdot h \cdot 45}$$

In this formula:
l is the length of the blade springs 18 and 19,
$U_D$ is the output voltage
$U_B$ is the operating voltage,
k is the proportionality factor of the strain gauges 22 and 23,
h is the thickness of the blade springs 18 and 19,
45 gives the influence of the transmission between the measurement sensors 5a, 5b and the blade springs 18, 19 in the ratio 5:1 for the reference distance b.

In this way an azimuth error of the capstan can be determined and can be transmitted from the measurement amplifier to a display means. The capstan can then be adjusted to the correct azimuth position either electrically or manually.

Figure 4:
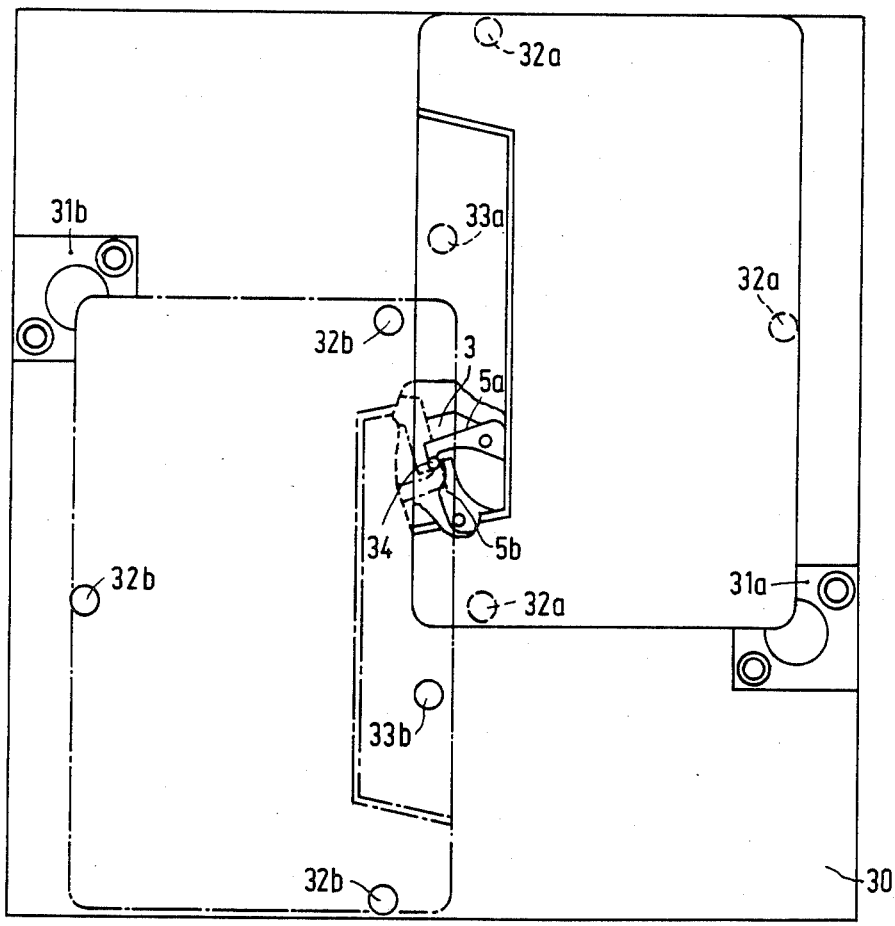
FIG. 4 is a plan view of the test cassette arranged on calibration template.

FIG. 4 shows a calibration template 30 carrying abutment blocks 31a and 31b, supporting pins 32a and 32b and reference pins 33a and 33b, which are arranged mirror-symmetrically relative to each other. The central reference point of this template is a cylindrical pin 34, which simulates the capstan of the apparatus. The angular position of this pin relative to the supporting surface of the test cassette is irrelevant for the alignment of the test cassette because it can be sensed twice by means of the template 30 in sensing positions which differ 180° from each other, because the test cassette 1 can be placed on the template 30 in positions which are 180° turned relative to each other. During the measurement the two readings of the measuring apparatus are set to zero during the first sensing operation of the pin 34. During the next measurement by sensing (180° turned) a reading equal to twice the angular displacement is obtained. During the second sensing operation of the pin 34 the two readings are set to half the measurement value. When the test cassette is again turned through 180°, half this measurement value is obtained again with an opposite sign. The measuring apparatus thus adjusted now enables the angular position of a capstan in a tape deck to be measured.

What is claimed is:

1. A test cassette with electrical transmission of measured values, for measuring the position of an element in a magnetic-tape-cassette apparatus, comprising at least one measurement sensor including an electrical measuring element for supplying a value which provides an indication of the position of said element in the apparatus, characterized by comprising a reference sensor, and means for mounting said sensors such that, when said cassette is present in a magnetic-tape-cassette apparatus having a capstan, said sensors together sense the azimuth position of the capstan, the azimuth position relative to the reference sensor being derived electrically from said measurement value.

2. A cassette as claimed in claim 1, characterized in that each sensor has a respective contact face arranged to engage said capstan, said contact faces being spaced from one another an axial distance, with respect to said capstan, which is a fixed predetermined reference distance, whereby the azimuth angle can be derived electrically from said measurement value.

3. A cassette as claimed in claim 2, characterized by comprising a support, said reference sensor forming part of said support, and said measurement sensor being carried on said support.

4. A cassette as claimed in claim 3, characterized by comprising two said measurement sensors, means for mounting said sensors rotatably on said support, with the contact faces of the respective measurement sensors engaging the capstan along directions which are 90° offset relative to each other, and means for applying a pretension to the respective measuring sensors for engaging the capstan under pretension.

5. A cassette as claimed in claim 4, characterized in that each measurement sensor comprises a blade spring and a strain gauge arranged on said spring, and said support comprises stops, during sensing said blade springs urging said capstan against said stops.

* * * * *